United States Patent [19]

Moriguchi

[11] Patent Number: 4,490,740
[45] Date of Patent: Dec. 25, 1984

[54] STATIONARY PLATEN TYPE MULTICOLOR ORIGINAL READING DEVICE

[75] Inventor: Fujio Moriguchi, Kanagawa, Japan
[73] Assignee: Fuji Xerox Co., Ltd., Tokyo, Japan
[21] Appl. No.: 409,001
[22] Filed: Aug. 17, 1982
[30] Foreign Application Priority Data Aug. 18, 1981 [JP] Japan ................. 56-128175

[51] Int. Cl.³ .............................. H04N 1/46
[52] U.S. Cl. ........................ 358/75; 358/901
[58] Field of Search .................. 358/75, 901

[56] References Cited

U.S. PATENT DOCUMENTS 3,619,484  11/1971  Tanaka ................. 358/75
3,739,095   6/1973  Alden .................. 358/901
4,220,978   9/1980  Rhyins ................. 358/901
4,303,936  12/1981  Shaw .................... 358/75
4,367,946   1/1983  Varner .................. 358/75

FOREIGN PATENT DOCUMENTS 611314  5/1978  U.S.S.R. ................. 358/75

Primary Examiner—Michael A. Masinick
Attorney, Agent, or Firm—Sughrue, Mion, Zinn, Macpeak and Seas

[57] ABSTRACT

A multicolor reading device is provided with a high intensity illuminating light source and a plurality of filters sequentially arranged in front of the source to provide monochromatic light of differing hues. The light is transmitted from the source to the platen by optical fibers or the like which are bundled on the source side and arranged in a line at the platen.

10 Claims, 4 Drawing Figures

STATIONARY PLATEN TYPE MULTICOLOR ORIGINAL READING DEVICE

BACKGROUND OF THE INVENTION

This invention relates to a stationary platen type multicolor original reading device as used in a facsimile device or an electronic copying machine, and more particularly to a stationary platen type multicolor reading device in which the original to be read is illuminated in multicolors for instance in red, green and blue, i.e., the three primary colors.

More specifically, the invention relates to a stationary platen type multicolor original reading device for a color facsimile or a color electronic copying machine, in which one image reading element such as a photodiode array is used, and wherein illuminating light hues are periodically switched to read the image in different hues, so that a plurality of color signals are obtained for one read line.

FIG. 1 is a sectional view outlining a conventional stationary platen type original multicolor reading device for use in a color facsimile.

In FIG. 1, reference numeral 1 designates an original; 2, a transparent platen; 3, a mirror; 4, a focusing (image-forming) lens; 5, a photo-electric reading element; 6, the output terminal of the photo-electric reading element; 14, an output signal amplifier; 15A and 15B, line memories; and 16, an arithmetic circuit.

Further in FIG. 1, reference numeral 21 designates a red fluoroescent lamp for illuminating the original; and 22, a white fluorescent lamp for the same. The fluorescent lamps 21 and 22 are turned on by high frequency signals, in such a manner that when a given lamp is turned on, the other is turned off.

Further in FIG. 1, reference numeral 10 designates a scanner on which the mirror 3, the lens 4, the photo-electric reading element 5, the red fluorescent lamp 21 and the white fluorescent lamp 22 are mounted, the scanner 10 being driven intermittently in the auxiliary scanning direction; and 11, a guide rail for guiding the scanner 10.

When the scanner 10 is set at a given position on the guide rail 11, the illumination position of the original 1, i.e., the main scanning line on the original is determined.

The original 1 at that position is firstly irradiated by the red fluorescent lamp 21. Light reflected from the rear surface (picture surface) of the original 1 is applied to the lens 4 by the mirror 3, so that the optical image of the picture is formed on the photo-electric reading element 5 (such as a photo-diode array).

The photo-electric reading element 5, being driven by a suitable control means (not shown) in synchronization with the turning on of the red fluorescent lamp, reads as an electrical signal a part of the original image corresponding to one main line at the time of illumination with the red lamp. The electrical signal is stored in the line memory 15A.

Then, the red fluorescent lamp 21 is turned off, while the white fluorescent lamp 22 is turned on. Similarly as in the above-described case, the photo-electric reading element reads as an electrical signal the part, corresponding to the same main scanning line, of the image of the original which is illuminated by the white light. This electrical signal is stored in the line memory 15B.

Thereafter, the scanner 10 is moved by as much as one line in the auxiliary scanning direction along the guide rail. Under this condition, the same reading operation is carried out. By repeatedly carrying out the above-described operation, the original is completely read.

The video signals stored in the memories 15A and 15B are supplied to the arithmetic circuit 16, where they are suitably process in a conventional manner and are then output for printing or for transmission to the receiving end, etc.

It is obvious that, when red, blue and green fluorescent lamps are provided for illuminating the original and are turned on the stated order, a natural color image can be read and transmitted.

In the conventional multicolor original illuminating device as described above, the fluorescent lamps are turned on by the high frequency signal and the scanner is moved by one main scanning line intermittently, for instance, every 5 m sec. Therefore the device suffers from the following difficulties:

(1) A fluorescent lamp has no monochromatic spectrum and has a wide emission spectrum. Therefore, the fluorescent lamp is low in color separating capability. Therefore, the reproduced image is low in color purity or color resolution. The spectral range may be decreased by the use of a filter, but the intensity of the illumination is insufficient in this case.

(2) The illuminance distribution characteristic of a bar-shaped fluorescent lamp is such that the emission intensity is high at the middle of the lamp, but lower towards either end thereof. Therefore, in order to uniformly illuminate the surface of the original, the fluorescent lamp must be much longer than the width of the original. Accordingly, the illuminating device is bulky.

A method of correcting the illuminance distribution characteristic using shading means may be taken into account. However, this method is disadvantageous in that the illuminance of the read surface of the original is low as a whole, and the reading sensitivity and speed are reduced.

(3) The scanner is considerably heavy because the fluorescent lamps in the light source, the image forming optical system and the photo-electric reading element are mounted thereon. Therefore, the scanner has large inertia. Accordingly, it is considerably difficult to accurately intermittently move the scanner a predetermined extremely short distance in a short time—i.e. every 5 m sec. This fact is an impediment in producing an increase in the copying speed or facsimile transmission speed and any improvement in the quality of the reproduced image.

SUMMARY OF THE INVENTION

An object of this invention is to provide a stationary platen type multicolor reading device in which the above-described difficulties accompanying the conventional device have been eliminated, and in which the size is relatively small, the optical intensity at the original reading surface is sufficient, and the auxiliary scanning operation including the intermittent movement of the illuminating light source can be readily and accurately carried out.

In order to achieve the foregoing object, in the invention, the light source section is made up of a high luminance discharge lamp, such as a xenon lamp, and a color filter, and monochromatic light of selected hues are transmitted through light guides (such as optical fibers) to the original reading surface.

Furthermore, only the image forming optical system made up of the mirror 3 and the image forming lens 4, the photo-electric reading element 5 and the light output ends of the light guides are mounted on the scanner 10 which is driven intermittently for auxiliary scanning. The light source section is set stationary or is mounted on a carrier which is moved irrespective of the intermittent movement for auxiliary scanning.

DETAILED DESCRIPTION OF THE PREFERRED EMBODIMENTS

Figure 2:
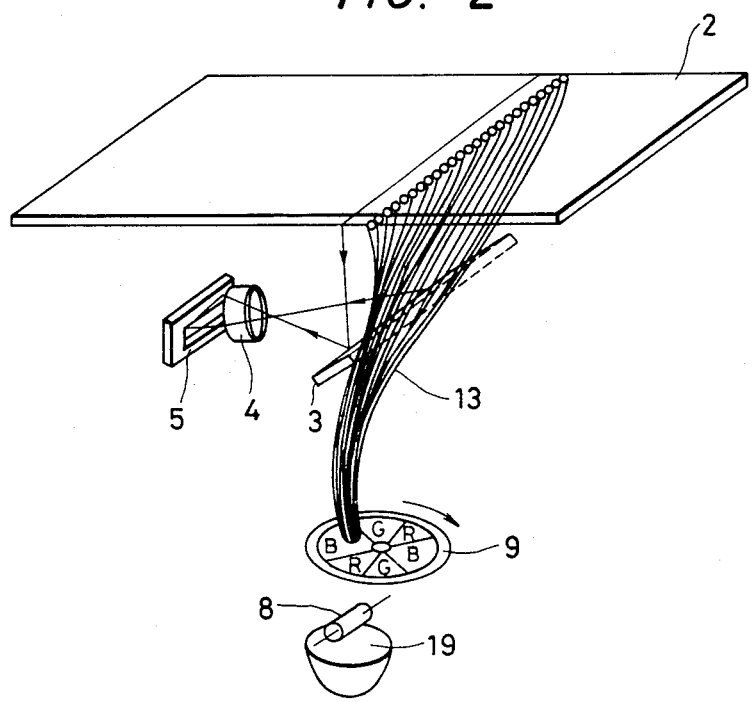
FIG. 2 is a perspective view outlining a stationary platen type multicolor reading device according to one embodiment of the invention.
Figure 3:
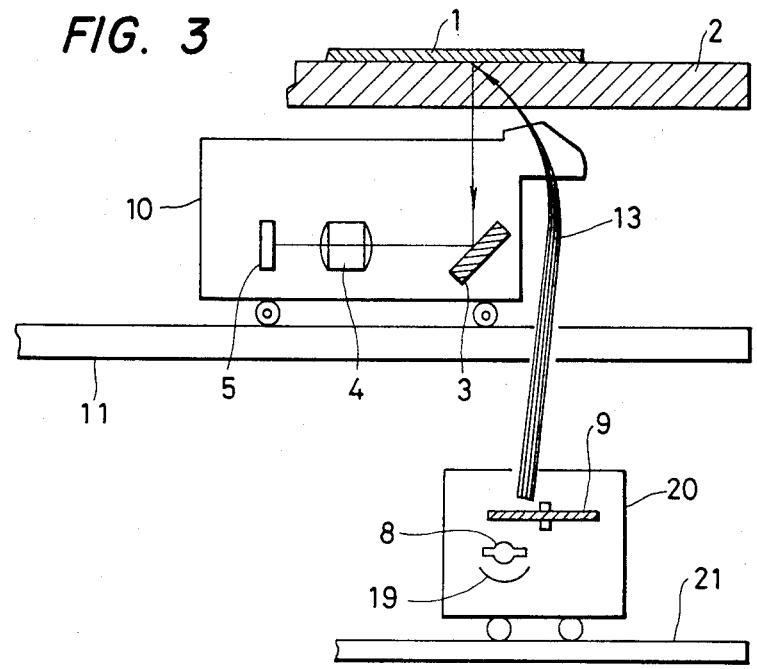
FIG. 3 is a sectional side view outlining the essential components of the reading device of FIG. 2.

This invention will now be described with reference to the accompanying drawings. FIG. 2 is a perspective view outlining one embodiment of the invention, and FIG. 3 is a sectional view of the essential components thereof.

In these figures, those elements which have been described previously with reference to FIG. 1 are therefore similarly numbered. In FIGS. 2 and 3, reference numeral 8 designates a xenon lamp; 9, a color filter, and 13, light guides (such as optical fibers). The light input ends of the light guides are bundled together so that they confront the color filter. Under this condition, the light guides are spread in the form of a sector so that the output ends thereof confront the platen. More specifically, the light output ends are substantially linearly aligned for a length which is substantially equal to the maximum width of originals used.

The color filter 9 is driven by a synchronous motor (not shown). Suitable means (not shown) causes the xenon lamp 8 to emit light in synchronization with the rotation of the color filter and with a predetermined timing.

The color filter 9 is in the form of a disk as shown in FIG. 2. The color filter 9 comprises six sections for passing red (R), blue (B) and green (G) light. The bundled light input ends of the light guides 13 are set behind the color filter 9.

Light from the xenon lamp 8 is reflected by an elliptic reflecting mirror 19 and is passed through the color filter 9, so that the image of the light source is formed near the input ends of the light guides 13. Therefore, it is desirable that the input ends of the light guides 13 be bundled in a form which substantially coincides with the image of the light source.

The light guides 13 guide the light from the xenon lamp, which has been changed into monochromatic light by a color filter 9, towards the reading section of the platen 2, so that the original is illuminated thereby. Light reflected from the original 1, which is illuminated by the light from the output ends of the light guides 13, is focused on the photo-electric reading element 5 by the lens 4.

The photo-electric reading element starts scanning with a scanning trigger signal synchronous with the rotation of the color filter 9, and supplies the read-out video signals to an amplifier (not shown).

Figure 1:
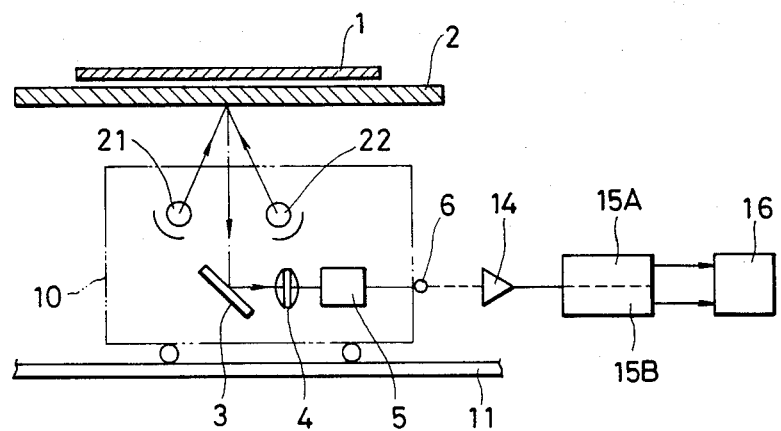
FIG. 1 is a sectional view outlining a conventional stationary platen type multicolor original reading device for a color facsimile.

Similarly as in the case of FIG. 1, the output signals of the amplifier are stored in line memories and are then suitably processed, so as to be transmitted to external units or stations. Alternatively, the output signals may be directly transmitted to the external units or stations.

As is apparent form FIG. 3, the mirror 3, the image forming lens 4, the photo-electric reading element 5 and the light output ends of the light guides 13 are mounted on the scanner 10. These elements are moved, as one unit, on the guide rail 11 intermittently with the timing of the auxiliary scanning.

On the other hand, an illuminating light source section comprising the xenon lamp 8, the color filter 9 and the elliptical reflecting lamp 19 is mounted on a carrier 20 which is moved on a second guide rail 21.

Figure 4:
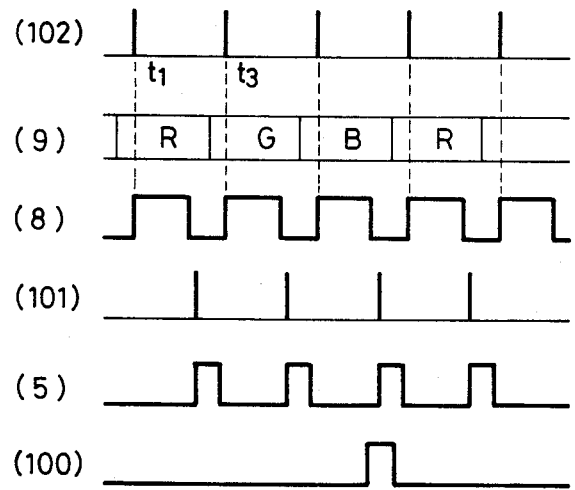
FIG. 4 is a timing chart for describing the operation of the reading device according to the invention.

FIG. 4 is a timing chart for describing the operation of the multi-color reading device constructed as described above. The filter 9 is synchronously rotated by a motor (not shown). At the time instant $t_1$ when one of the filter sections of the filter 9—for instance the red section—the xenon lamp 8 and the light input ends of the light guides 13 are in one straight line, a light emission trigger signal (102) is produced to cause the xenon lamp 8 to emit light for a predetermined period (waveform 8 in FIG. 4).

Light from the xenon lamp 8 is changed into monochromatic light when passed through the red section of the filter 9. The monochromatic light is made to converge near the light input ends of the light guides 13. The light, being guided by the light guides 13, reaches the reading section of the platen 2, to illuminate the original 1. Light reflected from the original 1 is focussed on the photo-electric reading element 5 by means of the mirror 3 and the image forming lens. In this operation, the photo-electric reading element 5 does not yet start scanning, i.e., it is in a standby state with all the bits energized.

At the time instant $t_2$ after the photo-electric reading element 5 has been exposed to the light, the scanning trigger signal (101) is produced by suitable means (not shown). With the aid of the scanning trigger signal (101), the photo-electric reading element 5 starts scanning, so that all the bits are scanned according to a clock signal (waveform 5 in FIG. 4).

When the next filter section—for instance the green section—comes into a line connecting the xenon lamp 8 and the light input ends of the light guides 13 at a time instant $t_3$ (as indicated by the waveform 8 of FIG. 4), the xenon lamp 8 is lighted again. Similarly as in the above-described case, the illumination of the original and the scanning of the photo-electric reading element are carried out.

With respect to the blue filter section also, a reading operation is carried out completely similar to the above-described case. During the reading operations with respect to the red, green and blue filter sections, the scanner is maintained stopped.

In the embodiment described above, for one main scanning line, reading operations with red, green and blue monochromatic light are carried out. Therefore, the synthesization of the output signals of the amplifier 14, which are provided in these reading operations, forms a natural color signal.

When the reading operations with the three primary colors (R, G and B) have been achieved with respect to one main scanning line as described above, the scanner 10 is moved by one line as indicated by the waveform (100) in FIG. 4. Then, with respect to the new main scanning line, the illumination and the reading operations are carried out similarly as in the above-described case. By repeatedly carrying out the above-described operation, the original is read, so that the data (picture) of the original are converted into electrical signals.

In the embodiment shown in FIG. 3, as the distance of movement, in the auxiliary scanning direction, of the scanner 10 is increased to some extent (or as the scanner 10 is moved in the auxiliary scanning direction), the carrier 20 with the light source section is moved to some extent.

In this case, the carrier 20 may be moved continuously unlike the scanner 10 which is moved intermittently and synchronously, because the light guides 13 are flexible and sufficiently long. That is, the carrier 20 may be moved relatively freely.

If the light guides 13 are made sufficiently long, the light source section may be fixedly secured irrespective of the movement, in the auxiliary scanning direction, of the scanner. In this case, it is obvious that the carrier 20 and the guide rail 21 can be eliminated.

It goes without saying that in addition to the above-described xenon lamp, a halogen lamp or a white discharge lamp such as a high voltage mercury lamp can be employed as the light source of this invention. Furthermore, a plurality of monochromatic light sources each having a narrow spectral characteristic as desired may be used as the light source of the invention. In this case, the color filter can be eliminated.

As is apparent from the above description, according to the invention, the illuminating light source section for periodically and selectively outputting monochromatic light having plural hues is connected through the light guides (such as optical fibers) to the original and the light output ends of the light guides, the mirror, the image forming lens and the photo-electric reading element are set on the scanner 10 which is driven intermittently for auxiliary scanning, but the light source section is not set on the scanner. With the reading device of the invention constructed as described above, the following effects or merits are provided:

(1) The degree of freedom in the arrangement position of the light source section is considerably large.

(2) Hue control can be readily achieved by selection of the filter.

(3) As the intensity of the illuminating light can be increased, reading can be done at higher speeds and the reading sensitivity can be improved.

(4) No bar-shaped light source is used, and the light output ends of the light guides are arranged over a length which is substantially equal to the maximum width of originals used. Therefore, the reading device of the invention can be made small in size.

(5) Since the illuminating light source section is not set on the scanner, the scanner is smaller in weight by as much, and accordingly the intermittent drive of the scanner can be performed positively.

(6) By adjusting the transmission characteristics (transmission spectrum widths) of the sections of the filter in agreement with the wavelength sensitivity characteristic of the photo-electric reading element, matching of the reading sensitivity or output for each single color can be readily achieved.

(7) The optical intensity at the light output ends of the light guides is relatively uniform, and therefore the use of the shading means is unnecessary.

(8) Even in the case where the carrier with the light source is moved with the auxiliary scanning operation of the scanner, it is unnecessary to intermittently drive the carrier. Therefore, the reading device can be smoothly driven.

What is claimed is:

1. A stationary platen type multicolor reading device comprising:
    a platen on which an original is placed;
    an illuminating light source section for periodically and selectively outputting monochromatic illuminating light of different hues;
    light guides having light input ends confronting said illuminating light source section and light output ends confronting a reading section of said platen;
    a photo-electric reading element for receiving that light emitted from said output ends of said light guides which is reflected from said original on said platen;
    said light output ends of said light guides and said photo-electric reading element being mounted on a scanner wherein said scanner is movable incrementally with respect to said platen; and
    means for triggering said photo-electric reading element in synchronization with the period selection of said illuminating light to output as electrical signals the images of an illuminated portion of said original.

2. A device as claimed in claim 1, said light guides comprising optical fibers, said fibers being bundled at the input ends thereof, the output ends thereof being substantially linearly aligned at said reading section.

3. A device as claimed in claim 2, the length of said aligned output ends being substantially equal to the maximum permissible width of an original.

4. A device as claimed in claim 1, further including an image forming optical system for focusing said reflected light on said photoelectric reading element.

5. A device as claimed in claim 1, said illuminating light source section comprising a high intensity light source, and a plurality of filters selectively positioned between said light source and said light input ends of said light guides.

6. A device as claimed in claim 1, including means for incrementally moving said scanner by one scanning line in an auxiliary scanning direction in synchronization with said periodic selection of said illuminating light.

7. A device as claimed in claim 6, said scanner being moved after said portion of said original is separately illuminated by all of said different hues.

8. A device as claimed in claim 4, said illuminating light source section being fixedly secured independently of said scanner.

9. A device as claimed in claim 4, said illuminating light source section being movably mounted independently of said scanner.

10. A stationary platen type multicolor reading device, comprising:
    an platen on which an original is placed;
    an illuminating light source section for periodically and selectively outputting monochromatic illuminating light of different hues;
    light guides arranged in the form of a sector, said light guides having light input ends bundled together to confront said illuminating light source section and light output ends substantially linearly aligned for a distance substantially equal to the maximum width of an original, said light output ends confronting a reading section of said platen;

a photo-electric reading element;

an image forming optical system for focusing, on said photo-electric reading element, that light which is emitted from said output ends of said light guides and is reflected from said original on said platen;

means for triggering said photo-electric reading element in synchronization with the periodic selection of said differently hued illuminating light to output as electrical signals the images of said original as illuminated by said illuminating light of a given hue;

a scanner mounting said light output ends of said light guides, said image forming optical system and said photo-electric reading element;

means for incrementally moving said scanner intermittently by one auxiliary scanning line in synchronization with the period of the selection of said different hues; and means for driving said illuminating light source section independently of said scanner.

* * * * *